(12) United States Patent
Du et al.

(10) Patent No.: US 7,516,181 B1
(45) Date of Patent: Apr. 7, 2009

(54) TECHNIQUE FOR PROJECT PARTITIONING IN A CLUSTER OF SERVERS

(75) Inventors: Yi Du, Vienna, VA (US); Benjamin Z. Li, McLean, VA (US); Ningning Liu, Sterling, VA (US); Ramprasad Polana, Sterling, VA (US); Quoc Cuong Bui, Arlington, VA (US)

(73) Assignee: Microstrategy, Inc., McLean, VA (US)

( * ) Notice: Subject to any disclaimer, the term of this patent is extended or adjusted under 35 U.S.C. 154(b) by 761 days.

(21) Appl. No.: 11/052,469

(22) Filed: Feb. 8, 2005

(51) Int. Cl.
*G06F 15/16* (2006.01)

(52) U.S. Cl. .................. 709/205; 709/219; 709/220; 709/221; 709/222; 709/223; 709/224; 709/225; 709/226; 709/227; 709/228; 709/229

(58) Field of Classification Search .................. 709/205, 709/219–229
See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 4,876,643 A | 10/1989 | McNeill | |
| 5,197,005 A | 3/1993 | Shwartz | |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nirenberg | |
| 5,692,181 A | 11/1997 | Anand | |
| 5,864,856 A | 1/1999 | Young | |
| 5,914,878 A | 6/1999 | Yamamoto | |
| 5,938,732 A | 8/1999 | Lim et al. | |
| 6,078,960 A | 6/2000 | Ballard | |
| 6,104,717 A * | 8/2000 | Coile et al. .................. 370/401 |
| 6,128,642 A | 10/2000 | Doraswamy et al. | |

(Continued)

OTHER PUBLICATIONS

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

(Continued)

*Primary Examiner*—Liangche A Wang
(74) *Attorney, Agent, or Firm*—Hunton & Williams LLP

(57) ABSTRACT

A technique for project partitioning in a cluster of servers is disclosed. In one particular exemplary embodiment, the technique may be realized as a method for partitioning a plurality of projects among a cluster of servers. The method may comprise determining a status of project partition among the cluster of servers. The method may also comprise generating a partition plan for re-partitioning the plurality of projects among the cluster of servers based at least in part on the status and a partition policy, wherein the partition policy comprises one or more rules selected from a group consisting of a user specified project-server association rule, a weighted balancing rule, and a project redundancy rule. The method may further comprise communicating the partition plan to each of the cluster of servers. The method may additionally comprise causing the plurality of projects to be re-partitioned among the cluster of servers based on the partition plan.

15 Claims, 9 Drawing Sheets

U.S. PATENT DOCUMENTS

| | | | |
|---|---|---|---|
| 6,154,766 | A | 11/2000 | Yost |
| 6,212,521 | B1* | 4/2001 | Minami et al. ................ 707/10 |
| 6,247,008 | B1 | 6/2001 | Cambot |
| 6,279,033 | B1 | 8/2001 | Selvarajan |
| 6,578,007 | B1* | 6/2003 | Howes et al. .................. 705/9 |
| 6,601,101 | B1 | 7/2003 | Lee et al. |
| 6,675,199 | B1 | 1/2004 | Mohammed et al. |
| 7,028,212 | B1* | 4/2006 | Nair et al. ...................... 714/4 |
| 2002/0019873 | A1 | 2/2002 | Goldszmidt et al. |
| 2002/0040400 | A1 | 4/2002 | Masters |
| 2002/0078209 | A1 | 6/2002 | Peng |
| 2002/0082748 | A1* | 6/2002 | Enga et al. .................. 700/291 |
| 2002/0099829 | A1 | 7/2002 | Richards et al. |
| 2003/0014526 | A1 | 1/2003 | Pullara et al. |
| 2003/0023669 | A1 | 1/2003 | DeLima et al. |
| 2003/0105903 | A1* | 6/2003 | Garnett et al. ............. 710/300 |
| 2004/0167840 | A1* | 8/2004 | Tully et al. .................... 705/35 |
| 2005/0086341 | A1* | 4/2005 | Enga et al. .................. 709/224 |
| 2005/0149940 | A1* | 7/2005 | Calinescu et al. ........... 718/104 |
| 2005/0225552 | A1* | 10/2005 | Anand ........................ 345/473 |
| 2005/0242948 | A1* | 11/2005 | Tarr ....................... 340/539.22 |

OTHER PUBLICATIONS

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

GIS/LIS'88 Proceedings accessing the world, vol. 2 pp. 741-750.

Business Objects User's Guide Version 5.1 (electronic copy on enclosed CD).

Getting Started with Business Objects Version 5.1 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Update Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excel Add-In MicroStrategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

P. Srisuresh, D. Gan, Loan Sharing using IP Network Address Translation, Juniper Networks, Inc., Aug. 1998, p. 1-18.

Alan Robertson, Linux—HA Heartbeat System Design, Proceedings of the 4th Annual Linux Showcase & Conferences, Atlanta, Oct. 10-14, 2000, 12 pages.

Trevor Schroeder, Steve Goddard, Byrav Ramamurthy, Scalable Web Server Clustering Technologies, May/Jun. 2000, University of Nebraska-Lincoln, p. 38-45.

Eric Levy-Abegnoli, Arun Iyengar, Junehwa Soong, Daniel Dias, Design and Performance of a Webserver Accelerator, T.J. Watson Research Center, Yorktown Heights, NY, Jun. 1999, 9 pages.

Nozer D. Singpurwalla, Determining an Optimal Time Interval for Testing and Debugging Software, IEEE Transactions on Software Engineering, vol. 17, No. 4, Apr. 1991, p. 313-319.

Carmen Trammell, Quantifying the Reliability of Software: Statistical Testing Based on a Usage Model, Proceedings of the 2nd IEEE Software Engineering Standards Symposium, 1995, Department of Computer Science, University of Tennessee, Knoxville, TN, p. 208-218.

Andrew S. Tanenbaum, Distributed Operating Systems, Prentice Hall, Upper Saddle River, New Jersey, p. 245-375.

Business Objects Deployment Guide (electronic copy on enclosed CD).

Advanced Topics MicroStrategy Agent Version 6.0 (electronic copy on enclosed CD).

\* cited by examiner

Figure 8

| Name | Status | Workload | Protocol | Port |
|---|---|---|---|---|
| ⊞ Node 1 | | | | |
| Project A | Loaded | 4 | TCP/IP | 34952 |
| Project B | Unloaded | | | |
| Project C | Loaded | | | |
| Project D | Loaded | | | |
| Project E | Loaded | | | |
| ⊞ Node 2 | | | | |
| Project A | Loaded | 10 | TCP/IP | 34952 |
| Project B | Unloaded | | | |
| Project C | Unloaded | | | |
| Project D | Loaded | | | |
| Project E | Loaded | | | |
| ⊞ Node 3 | | | | |
| Project A | Loaded | 6 | TCP/IP | 34952 |
| Project B | Unloaded | | | |
| Project C | Unloaded | | | |
| Project D | Unloaded | | | |
| Project E | Loaded | | | |

Figure 9

| Name | Status | Workload | Protocol | Port |
|---|---|---|---|---|
| ⊟ Project A | | | | |
|   Node 1 (Primary Server) | Loaded | 4 | TCP/IP | 34952 |
|   Node 2 | Loaded | 10 | TCP/IP | 34952 |
|   Node 3 | Loaded | 6 | TCP/IP | 34952 |
| ⊟ Project B | | | | |
|   Node 1 | Unloaded | 10 | TCP/IP | 34952 |
|   Node 2 | Unloaded | 5 | TCP/IP | 34952 |
|   Node 3 | Unloaded | 6 | TCP/IP | 34952 |
| ⊟ Project C | | | | |
|   Node 1 (Primary Server) | Loaded | 4 | TCP/IP | 34952 |
|   Node 2 | Unloaded | 10 | TCP/IP | 34952 |
|   Node 3 | Unloaded | 6 | TCP/IP | 34952 |
| ⊞ Project D | | | | |
| ⊟ Project E | | | | |
|   Node 1 | Loaded | 10 | TCP/IP | 34952 |
|   Node 2 (Primary Server) | Loaded | 5 | TCP/IP | 34952 |
|   Node 3 | Loaded | 6 | TCP/IP | 34952 |

TECHNIQUE FOR PROJECT PARTITIONING IN A CLUSTER OF SERVERS

FIELD OF THE INVENTION

The present invention relates generally to load balancing and failures in server networks and, more particularly, to a technique for project partitioning in a cluster of servers.

BACKGROUND OF THE INVENTION

Clustering is a server architecture for interconnecting two or more individual servers in order to share application processing loads. A cluster of networked servers may coordinate with one another to host and to back up a plurality of projects.

One limitation in current techniques of server clustering is that all nodes of a cluster are required to host the exact same set of projects. Since there is typically a non-trivial amount of overhead cost for hosting a project, this limitation can be a hurdle to further expansion in large deployments. With this limitation, adding a new project will negatively affect the overall performance of a cluster, while adding another server to the cluster only brings a marginal improvement.

Another limitation in current techniques of server clustering lies in excessive downtime and other negative impacts associated with project maintenance operations. For example, unexpected errors encountered by a single project may cause a server to restart, thereby terminating all other projects hosted by the same server. Maintenance of one project may cause all servers in the cluster to slow down, thus affecting progress of other projects.

SUMMARY OF THE INVENTION

Embodiments of the present invention are directed to a technique for project partitioning in a cluster of servers which overcomes the above-described inadequacies and shortcomings.

In one particular exemplary embodiment, the technique may be realized as a method for partitioning a plurality of projects among a cluster of servers. The method may comprise determining a status of project partition among the cluster of servers. The method may also comprise generating a partition plan for re-partitioning the plurality of projects among the cluster of servers based at least in part on the status and a partition policy, wherein the partition policy comprises one or more rules selected from a group consisting of a user specified project-server association rule, a weighted balancing rule, and a project redundancy rule. The method may further comprise communicating the partition plan to each of the cluster of servers. The method may additionally comprise causing the plurality of projects to be re-partitioned among the cluster of servers based on the partition plan.

In another particular exemplary embodiment, the technique may be realized by a system for partitioning a plurality of projects among a cluster of servers. The system may comprise a plurality of project partition modules, each residing in one of the cluster of servers. Each project partition module may be adapted to determine a status of project partition among the cluster of servers. Each project partition module may also be adapted to generate a partition plan for re-partitioning the plurality of projects among the cluster of servers based at least in part on the status and a partition policy, wherein the partition policy comprises one or more rules selected from a group consisting of a user specified project-server association rule, a weighted balancing rule, and a project redundancy rule. Each project partition module may be further adapted to communicate the partition plan to other project partition modules in the cluster. Each project partition module may be additionally adapted to cause the plurality of projects to be re-partitioned among the cluster of servers based on the partition plan.

In another particular exemplary embodiment, the technique may be realized by an article of manufacture for partitioning a plurality of projects among a cluster of servers. The article of manufacture may comprise at least one processor readable carrier and instructions carried on the at least one carrier. The instructions may configured to be readable from the at least one carrier by at least one processor and thereby cause the at least one processor to operate so as to: determine a status of project partition among the cluster of servers; generate a partition plan for re-partitioning the plurality of projects among the cluster of servers based at least in part on the status and a partition policy, wherein the partition policy comprises one or more rules selected from a group consisting of a user specified project-server association rule, a weighted balancing rule, and a project redundancy rule; communicate the partition plan to each of the cluster of servers; and cause the plurality of projects to be re-partitioned among the cluster of servers based on the partition plan.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIGS. 6-9 depict screen shots of exemplary user interfaces for managing project partitioning in accordance with an embodiment of the present invention.

DETAILED DESCRIPTION OF EXEMPLARY EMBODIMENTS

To overcome the above-described limitations in current techniques of server clustering, it may be desirable to implement an asymmetric scheme of project partitioning in a cluster of servers, wherein each server or node may be allowed to host a subset of projects that may be different from the common set of projects hosted by the cluster. That is, it may be no longer necessary for each server to host the same common set of projects. This asymmetric scheme may be implemented and maintained through a plurality of functional modules embedded in the cluster of servers. For example, a project partition module (PPM) may be embedded in each server in a cluster. A PPM in one server may coordinate with PPMs in other servers to manage asymmetric project partitioning among the cluster of servers.

Figure 1:
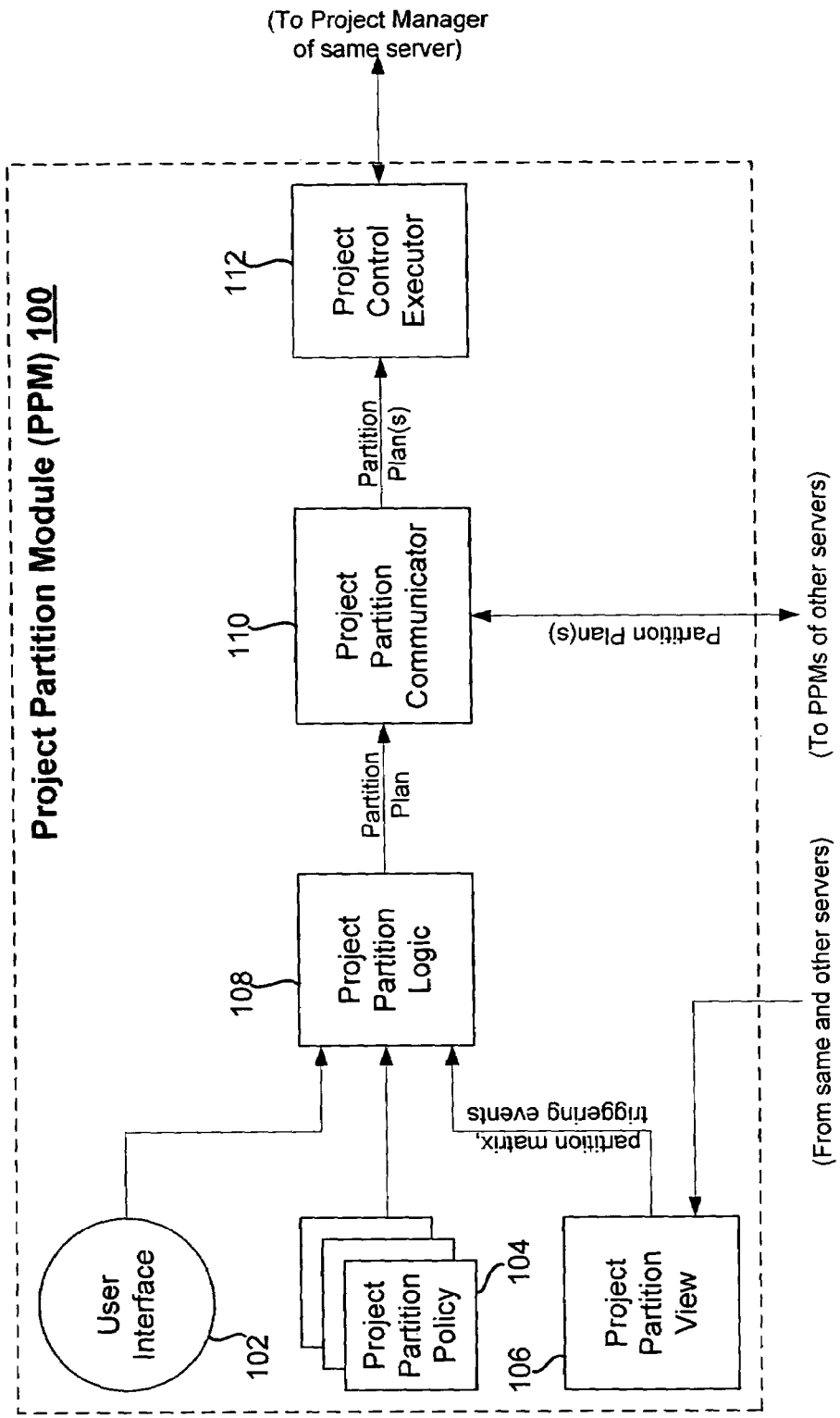
FIG. 1 depicts a block diagram illustrating an exemplary project partition module in accordance with an embodiment of the present invention.

Referring to FIG. 1, there is shown a block diagram illustrating an exemplary project partition module (PPM) 100 in accordance with an embodiment of the present invention. The PPM 100 may comprise a project partition logic unit 108. The project partition logic unit 108 may generate one or more project partition plans based on inputs it receives from at least three different sources.

Figure 6:
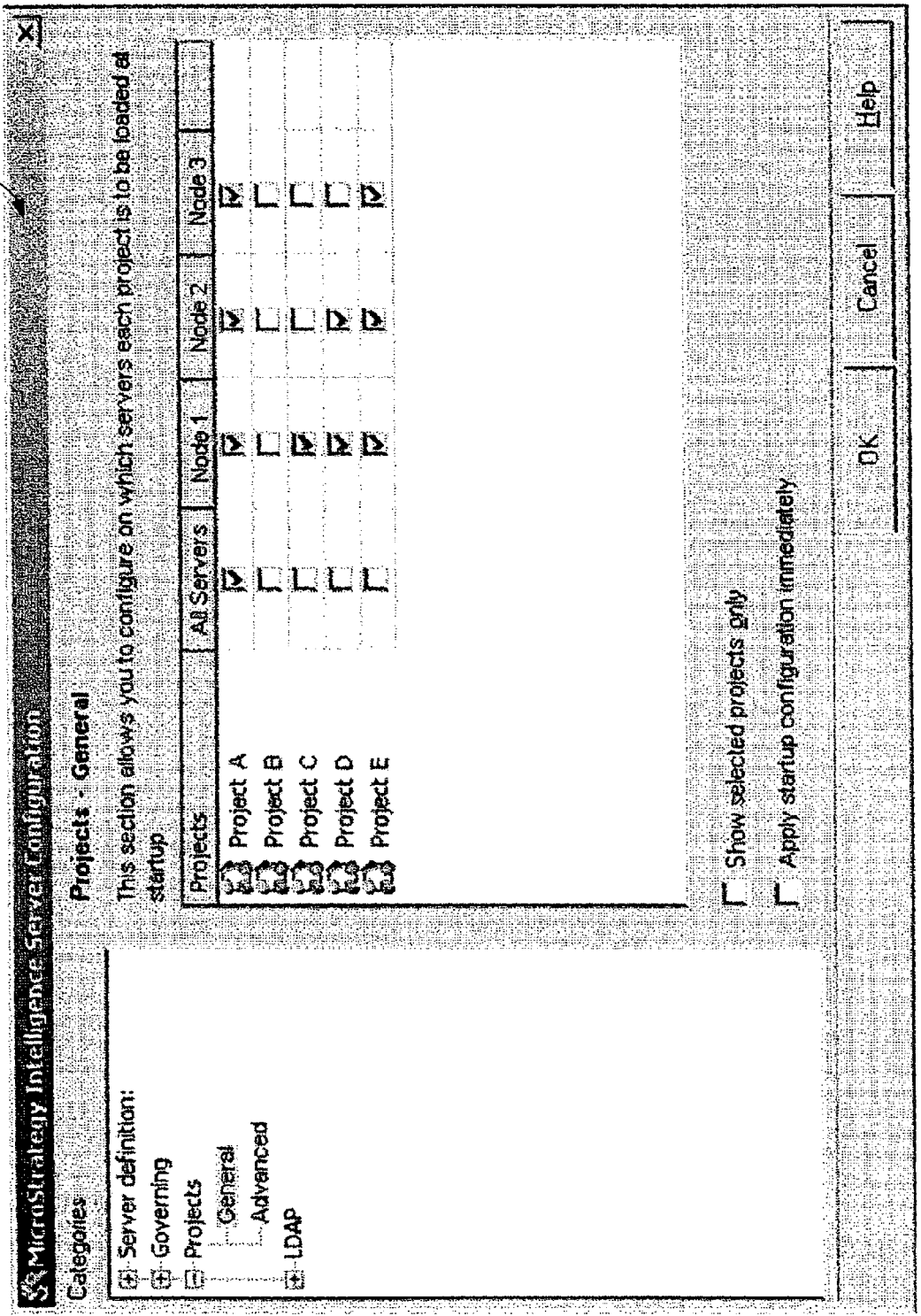

A first input may be received from a user interface 102 through which a user may manually specify project-to-server assignment preferences. FIG. 6 shows a screen shot of an exemplary user interface 600 for assigning projects to a cluster of servers. This user interface 600 is also known as a "Server Configuration Wizard" or "Desktop Server Configuration interface." The user interface 600 may present a list of servers in the cluster. The list may be assembled based on a startup map in the metadata and a current cluster membership (including both active and failed servers). The startup map may be part of a metadata object that specifies whether a project is to be loaded to a particular server when that server starts up. In this illustrative embodiment, a total of three servers (i.e., Node 1, Node 2 and Node 3) are listed. A checkbox column is displayed for each server and one checkbox column is displayed for "All Servers." As shown, a total of five projects (i.e., Projects A-E) may be manually assigned to the three servers. A user may explicitly assign a project to a server by clicking the checkbox that corresponds to the project and the server. For example, Project C is assigned to Node 1, Project D is assigned to Node 1 and Node 2, and Project E is assigned to Node 1, Node 2 and Node 3. No checkbox has been checked for Project B, indicating that it is not to be assigned to any server. The checkbox for Project A and "All Servers" is checked, which may cause other checkboxes in the same row to be checked and disabled. As a result, Project A may be loaded to Node 1, Node 2 and Node 3 at startup. Further, if any new server joins the cluster, Project A may also be loaded to the new server upon its startup. In comparison, Project E will only be loaded to Node 1, Node 2 and Node 3. When a new server joins the cluster, Project E will not be loaded to the new server since the "All Servers" checkbox for Project E is not checked. An option is also available to immediately implement the server configuration as soon as it is specified by the user.

Referring back to FIG. 1, a second input for the project partition logic 108 may be a project partition policy 104. The project partition policy 104 may comprise one or more rules for assigning projects and balancing project loads among the cluster of servers. Typical rules may include, for example, a project-server association rule manually specified by a user, a weighted balancing rule, and/or a project redundancy rule. A project-server association rule may reflect a user preference for hosting certain projects on a particular set of servers. A weighted balancing rule may dictate a weighted distribution of projects among the servers. For example, the weighted balancing rule may specify a predetermined or minimum percentage (or number) of servers that are required to host a project. The project redundancy rule may impose a requirement to have a predetermined number of backup instances (hot stand-bys) available for an active project.

A third input for the project partition logic 108 may be from a project partition view unit 106. The project partition view unit 106 may communicate with all servers in the cluster to determine a current status of project partition. The status of project partition may include but is not limited to server status (e.g., active, failed or restarted), server workloads and resource usage, and project distribution. The current status of project partition may be recorded in a project partition matrix. In addition, certain events in the cluster may trigger the PPM 100 into action. Typical triggering events may include some normal changes in cluster membership, such as a server joining or leaving the cluster, and some abnormal changes in cluster membership, such as a server crash or fail-over. The PPM 100 may also be explicitly triggered by a user via an application programming interface (API). Exemplary responses by the PPM 100 to some triggering events are described in detail below. The project partition view unit 106 may communicate the project partition matrix and the triggering events to the project partition logic unit 108 as part of its input.

The project partition logic unit 108 may generate a project partition plan based on one or more of the above-described three inputs. Generation of the project partition plan may occur at startup of a server, upon user instruction, or in response to certain triggering events. The project partition plan may specify a distribution or assignment of the projects among the cluster of servers. The project partition plan may also suggest delta actions to be taken by each server to in order to effectuate the plan. The delta actions may be the necessary actions taken by a server to change its project loading status to what is specified in the project partition plan.

According to an embodiment of the present invention, the project partition plan may be recorded in a new project partition matrix transformed from or based on a previous project partition matrix. An exemplary project partition matrix reflecting a 50% weighted balancing rule is shown in Table 1. As shown, each of the four projects (Projects 1-4) is supported by at least half of the available servers (Servers A-D) in accordance with the 50% weighted balancing rule.

TABLE 1

An Example of Project Partition Matrix

|  | Project 1 | Project 2 | Project 3 | Project 4 |
| --- | --- | --- | --- | --- |
| Server A | Yes | Yes | No | No |
| Server B | No | No | Yes | Yes |
| Server C | Yes | No | Yes | No |
| Server D | No | Yes | No | Yes |

Then, a project partition communicator 110 in the PPM 100 may communicate the newly generated project partition plan to PPMs of all the other servers in the cluster. Thus, all servers in the cluster may be notified of the expected changes in project partition. The project partition communicator 110 may also be capable of receiving project partition plans from other servers.

PPM 100 may also comprise a project control executor 112 that coordinates with a project manager in the same server to carry out the project partition plans generated locally or received from other servers. The project control executor 112 may take one or more project partition plans and cause the project manager to load or unload project(s) according to the plan(s). The project control executor 112 may support at least two action modes for execution of the project partition plan (s). In an instant mode, the project control executor 112 may carry out a project partition plan immediately after it is received or generated. In a delayed mode, the project control executor 112 may wait for a few minutes, for example, before responding to the plan(s). The delayed mode may be desirable when a server failure does not eliminate all instances of a project. During a time period, the PPM 100 may receive multiple (delayed-mode) project partition plans. The multiple plans may contain action items not necessarily consistent with one another. For example, one plan may request a particular project be unloaded in 5 minutes while a plan received within the 5-minute delay might request this particular project be kept alive. As a result, the project control executor 112 may be responsible for reconciling multiple project partition plans and resolving them into a final action for each project.

Figure 2:
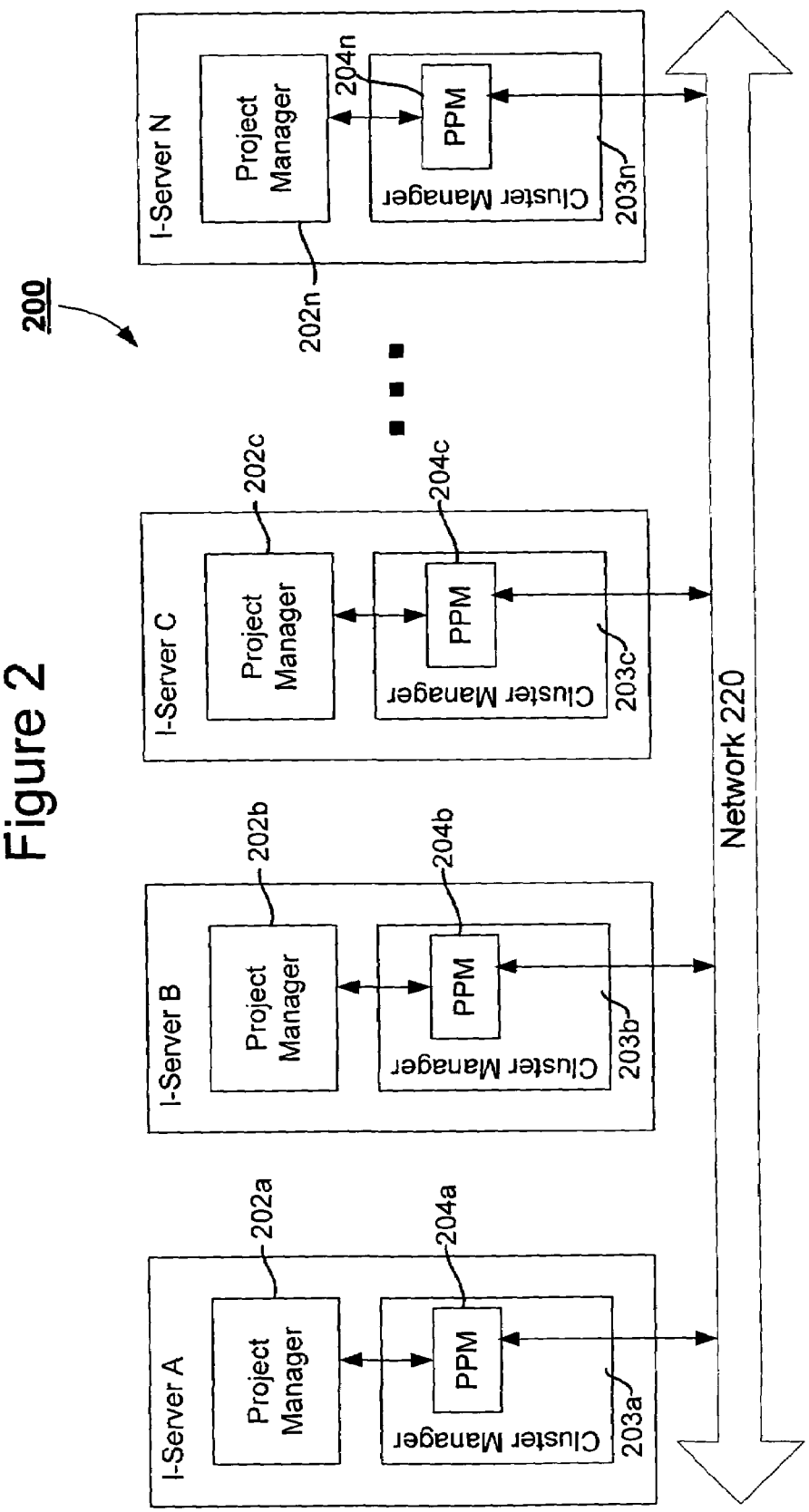
FIG. 2 depicts a block diagram illustrating an exemplary system for project partitioning in a cluster of servers in accordance with an embodiment of the present invention.

FIG. 2 depicts a block diagram illustrating an exemplary system 200 for project partitioning in a cluster of servers in accordance with an embodiment of the present invention. The cluster may comprise a plurality of intelligence servers (I-Servers) such as I-Server A, I-Server B, I-Server C, I-Server N and so on. Each I-Server may have a project manager 202, a cluster manager 203, and a project partition module (PPM) 204 as part of the cluster manager 203. Each PPM 204 may communicate with PPMs in other I-Servers via a network 220. A project partition plan may be generated locally by one PPM 204 and then communicated to other PPMs (204). Each PPM 204 may coordinate with its local project manager 202 to cause projects to be loaded or unloaded according to a received or locally generated project partition plan.

In one embodiment, an intelligence server may comprise a system as described in a co-pending, commonly assigned U.S. patent application Ser. No. 10/162,716, entitled "Technique for Handling Server Session Requests in a System Having a Plurality of Servers," filed Jun. 6, 2002, which is hereby incorporated by reference in its entirety.

Figure 3:
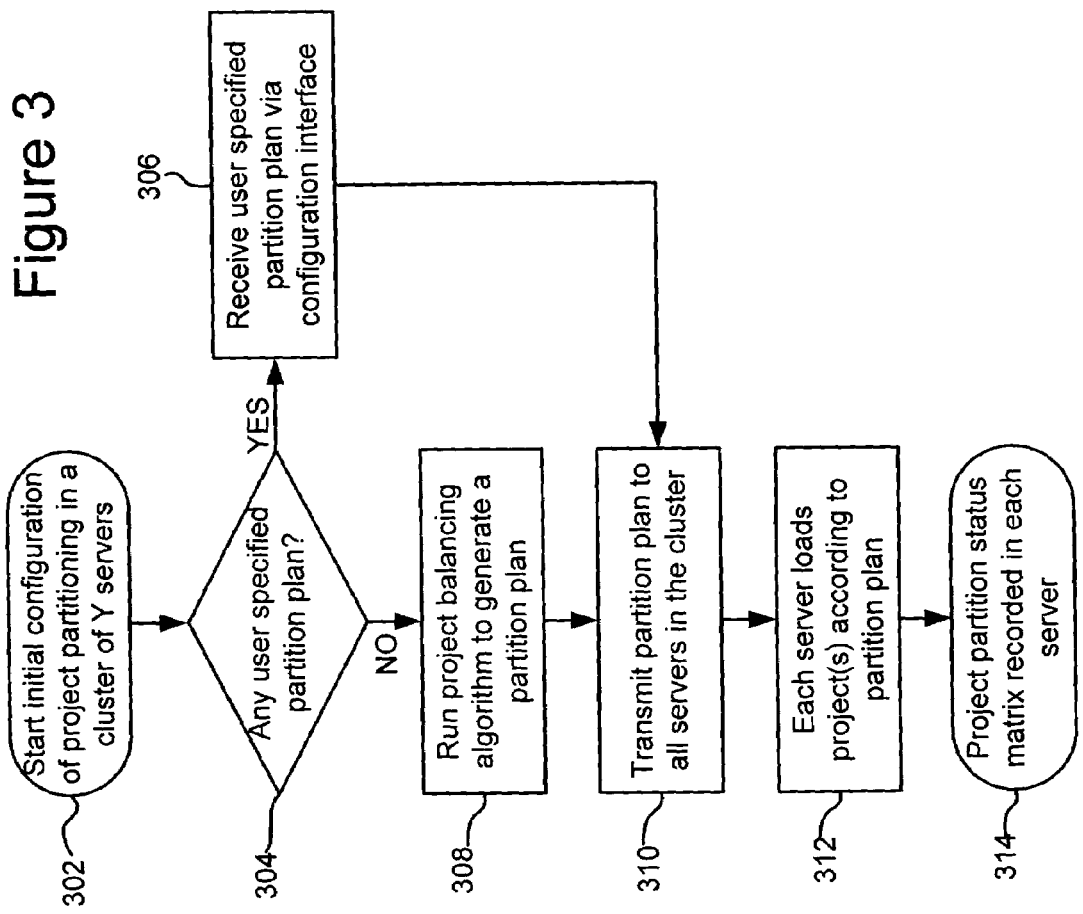
FIG. 3 depicts a flow chart illustrating an exemplary method for project partitioning in accordance with an embodiment of the present invention.

FIG. 3 depicts a flow chart illustrating an exemplary method for project partitioning in accordance with an embodiment of the present invention.

An initial configuration of project partitioning in a cluster of servers may start in step 302. In step 304, it may be determined whether there is any user specified partition plan. If so, such user specified partition plan may be received via a configuration interface in step 306. One example of the configuration interface is shown in FIG. 6. The user specified partition plan may include a preferred or mandatory project distribution scheme. After receiving the user specified partition plan, the process may branch to step 310.

If there is no user specified partition plan, then, in step 308, a project load balancing algorithm may be run to generate a project partition plan. The project load balancing algorithm may be implemented by a project partition module (PPM). The project partition plan may be generated based on a project partition policy as well as project volume and server resources.

In step 310, the project partition plan, either newly generated or user specified, may be transmitted to all servers in the cluster. In step 312, each server may load project(s) according to the project partition plan it receives. Then, in step 314, the resulting project-server status may be recorded in a project partition matrix which is synchronized across all servers in the cluster.

Figure 4:
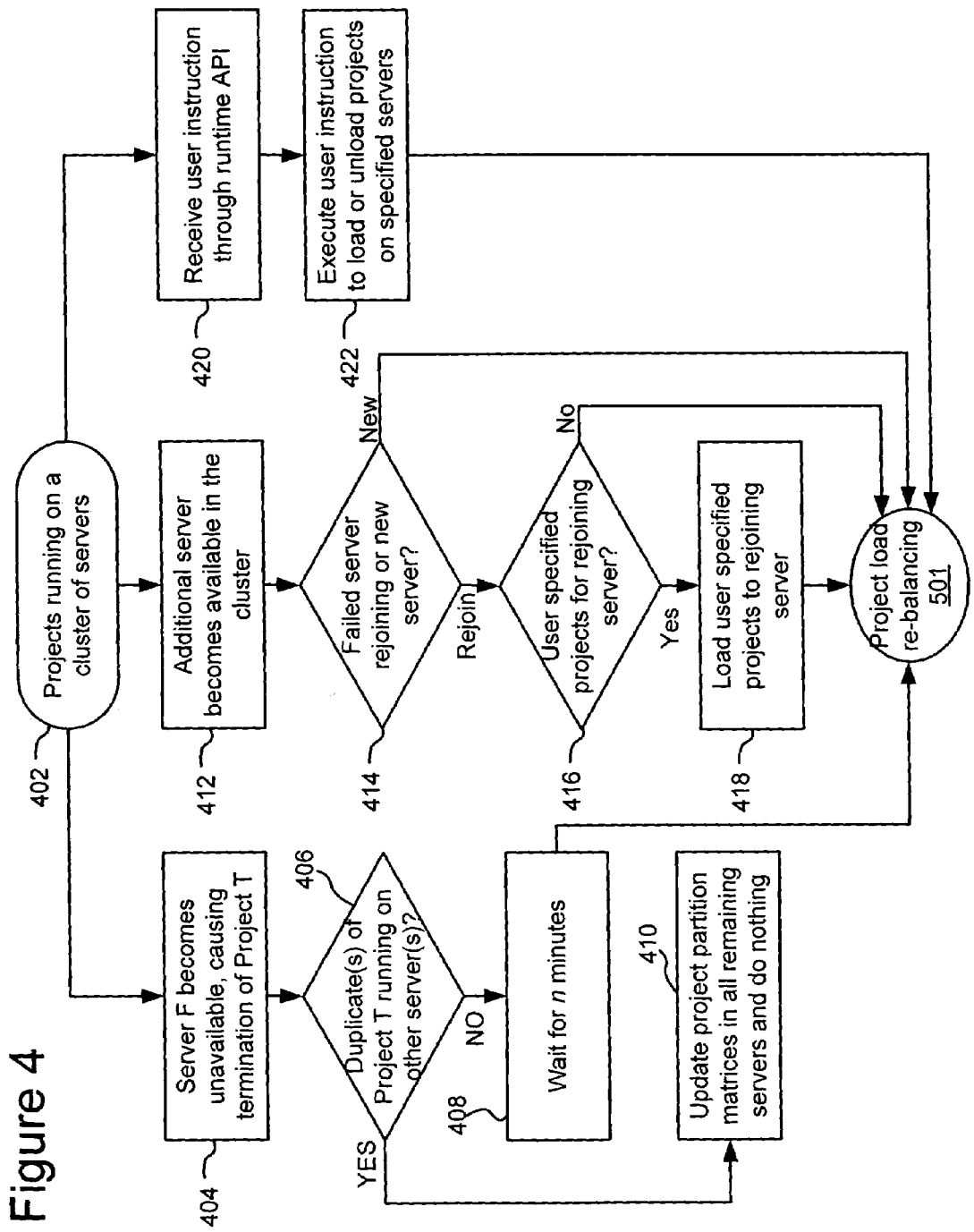
FIGS. 4 and 5 depict flow charts illustrating an exemplary method for project partitioning in response to triggering events in accordance with an embodiment of the present invention.
Figure 5:
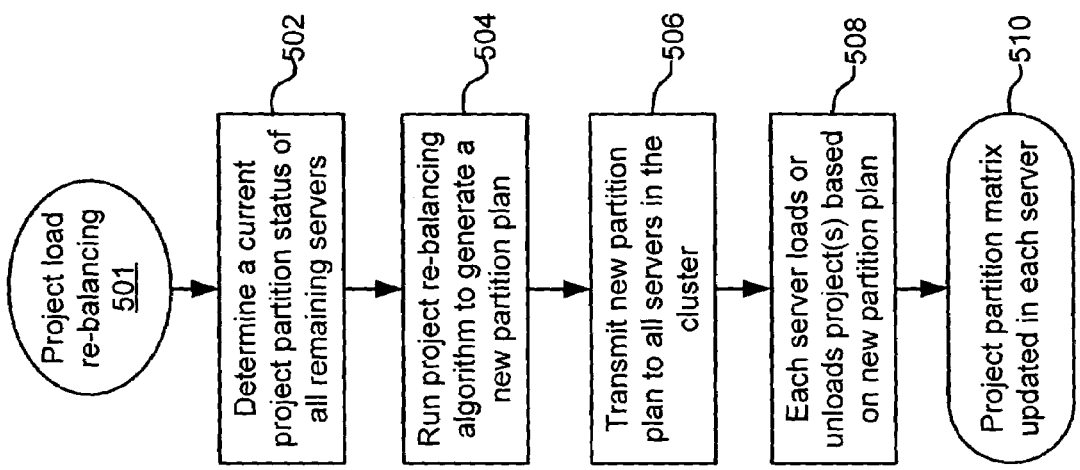

FIGS. 4 and 5 depict flow charts illustrating an exemplary method for project partitioning in response to triggering events in accordance with an embodiment of the present invention.

Once the initial configuration for project partitioning has been implemented, a common set of projects may be running on the cluster of servers in step 402, with each server hosting a subset of projects. However, a number of triggering events may affect the project partition status and may require a proper response from the servers.

One triggering event is shown in step 404 where a Server F becomes unavailable causing a Project T to terminate. A server in the cluster may become unavailable, for example, when it leaves the cluster, crashes or restarts. The Project T may be one of the projects hosted by Server F.

Upon loss of the Server F, one of the remaining servers in the cluster may be selected, based on a predetermined election algorithm, to execute the following method steps. This selected server may be referred to as a "deputy server."

Figure 7:
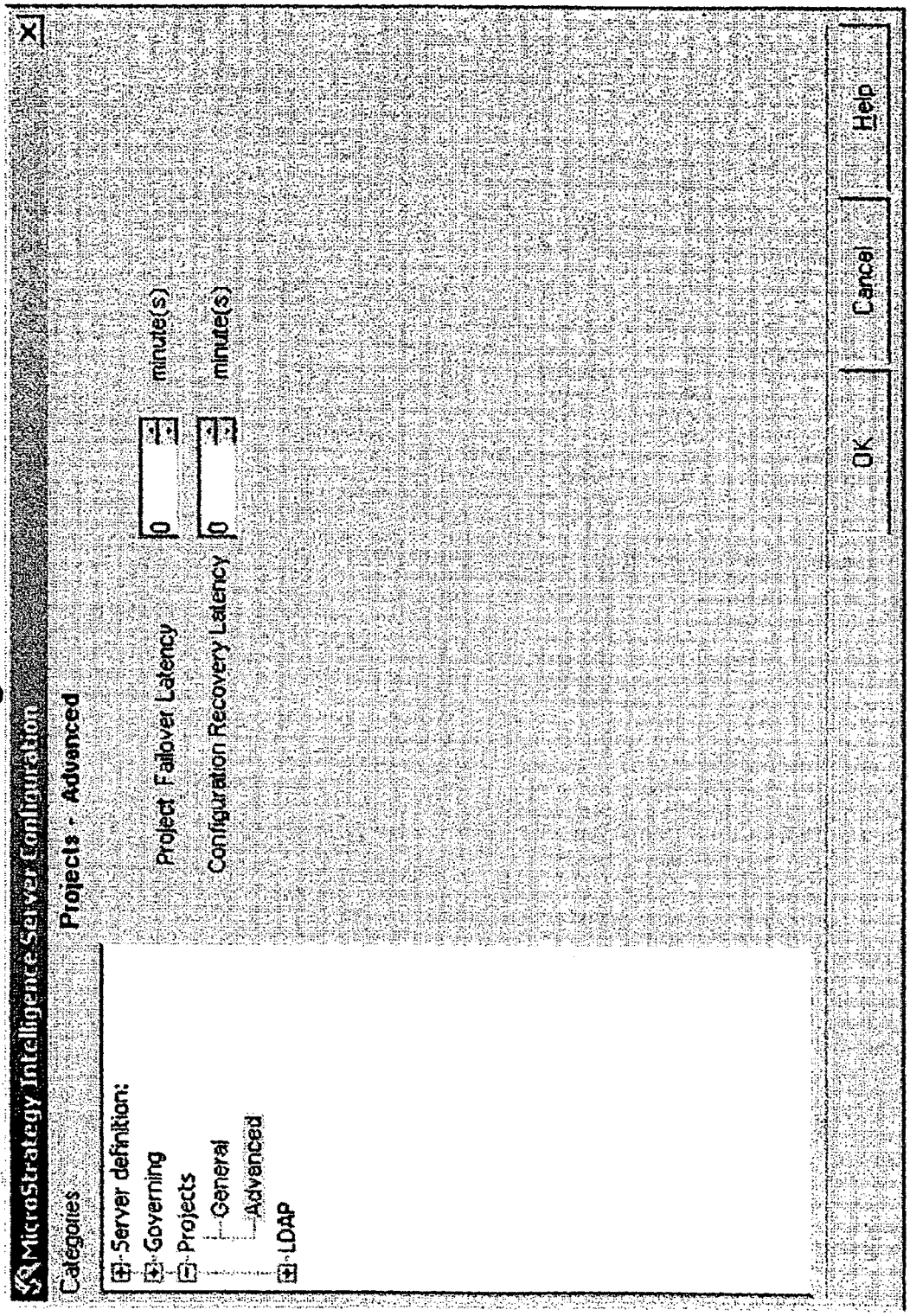

In step 406, it may be determined whether one or more duplicates of the Project T is running on some other server(s). If so, no action is necessary except that the project partition matrices in all the remaining servers may be updated, in step 410, to reflect the unavailability of Server F. If no duplicate of Project T exists on other servers, the deputy server may wait for n minutes (a grace period) in step 408. Then, upon expiration of the grace period, the process may branch to step 501 to start a project load re-balancing process as illustrated in FIG. 5. The grace period may be desirable for a number of reasons. For example, since a crashed server will typically restart automatically, it may be necessary to wait for the server to recover before restoring a normal operation. The grace period may also help reduce the frequency of project load balancing during the transient period when cluster membership reaches a stable state. For example, when a server restarts after a failover, it may restore the projects that were previously loaded on the server. If the restoration process is completed (or at least initiated) before the grace period expires, a project load re-balancing may not be necessary. Further, with the grace period, disturbance of the remaining servers may be kept to a minimum until a decision to put availability ahead of performance prevails. The grace period may be specified by a user through a user interface as exemplarily illustrated in FIG. 7.

According to embodiments of the present invention, a user may set a "Project Failover Latency" and a "Configuration Recovery Latency" in terms of minutes. The project failover latency may be the length of delay a server is required to implement before it carries out project load balancing actions due to failover of another server. Typically, such actions involve loading projects hosted by a crashed server to one or more surviving servers. The configuration recovery latency may be the length of delay a server (e.g., Server A) is required to implement before it unloads the projects it took over from a failed server (e.g., Server B). Once the failed server, Server B, is up and running again, there may no longer be a need for Server A to run the projects it took over from Server B. Therefore, after a delay of a few minutes (i.e., configuration recovery latency), Server A may unload those projects.

Another triggering event is shown in step 412 where an additional server becomes available in the cluster. The additional server may be a new server joining the cluster or a previous member of the cluster rejoining after a fail-over, for example. In step 414, it may be determined whether the additional server is a rejoining server or a new server. If it is a new server, the process may branch to step 501 to start project load re-balancing. If it is a rejoining server, it may be determined in step 416 whether user specified projects exist for the rejoining server. A user specified project may be one that has been explicitly assigned to this rejoining server. If there is no user specified project for the rejoining server, the process may branch to step 501. Otherwise, the user specified projects may be loaded onto the rejoining server in step 418 before the process moves on to step 501.

Another triggering event may be a user instruction as received in step 420 via a runtime API. That is, during runtime, a user may input explicit instructions to change a current project partition scheme. In step 422, the user instruction may be executed by loading and/or unloading certain project(s) on one or more servers. Then the process moves on to step 501 to start project load re-balancing.

Referring to FIG. 5, the project load re-balancing process may start in step 501. The project load re-balancing process may typically be performed by a project partition module in a designated server or an elected deputy server. In step 502, a current project partition status of all remaining servers in the cluster may be determined. The project partition status may be determined from an updated project partition matrix. In step 504, a project load re-balancing algorithm may be run to generate a new project partition plan based on the current project partition status and a project partition policy. In step 506, the new project partition plan may be transmitted to all active servers in the cluster. In step 508, each server may load or unload project(s) according to the new project partition plan. Finally, in step 510, each server may update its project partition matrix and the matrices may be synchronized across all servers in the cluster.

After an initial configuration of project partitioning or a project load re-balancing or at any point during runtime, it may be desirable for an administrator or user to directly monitor a current project-server configuration. A user interface known as a "Cluster Monitor" may provide a direct view of the status of all projects (whether loaded, unloaded, or ideal) for each node or server of the cluster. The Cluster Monitor may have two view modes: a server view and a project view. FIG. 8 shows an exemplary Cluster Monitor in a server view mode. In the server view mode, all projects and their status are listed according to their association with the servers. FIG. 9 shows an exemplary Cluster Monitor in a project view mode. In the project view mode, some or all servers and their workload status may be listed according to their association with the projects. In addition, under each project, one of the listed server names may be bolded (or otherwise highlighted) and have a string of "(Primary Server)" appended thereto to reflect its "Primary Server" status.

At this point it should be noted that the technique for project partitioning in a cluster of servers in accordance with the present invention as described above typically involves the processing of input data and the generation of output data to some extent. This input data processing and output data generation may be implemented in hardware or software. For example, specific electronic components may be employed in a computer network or similar or related circuitry for implementing the functions associated with project partitioning in accordance with the present invention as described above. Also, or alternatively, one or more processors operating in accordance with stored instructions may implement the functions associated with project partitioning in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as described herein.

The invention claimed is:

1. A method for partitioning a plurality of projects among a cluster of servers, the method comprising:
determining a status of project partition among the cluster of servers, wherein the cluster of servers hosts a common set of projects and each server of the cluster of servers hosts a subset of the common set of projects;
generating a partition plan for re-partitioning the plurality of projects among the cluster of servers based at least in part on the status and a partition policy, wherein the partition policy comprises one or more rules selected from a group consisting of:
a user specified project-server association rule,
a weighted balancing rule, and
a project redundancy rule;
communicating the partition plan to each of the cluster of servers; and
causing the plurality of projects to be re-partitioned among the cluster of servers based on the partition plan.

2. The method according to claim 1 being triggered by one or more events selected from a group consisting of:
a server leaving the cluster;
an additional server joining the cluster;
failure of at least one server in the cluster;
restart of at least one server in the cluster; and
a user trigger via an application program interface.

3. The method according to claim 1 further comprising:
re-partitioning, after a predetermined delay, the plurality of projects among the cluster of servers if a server running one or more projects becomes unavailable and no duplicate for the one or more projects exists on any other server.

4. The method according to claim 1 further comprising:
selecting, based on an election algorithm, a surviving server of the cluster of servers to generate the partition plan when a server of the cluster of servers becomes unavailable.

5. The method according to claim 1, wherein the status of project partition among the cluster of servers is recorded in a partition matrix.

6. The method according to claim 5, wherein the partition plan comprises a transformed matrix based on the partition matrix.

7. The method according to claim 6 further comprising:
communicating the transformed matrix to each server in the cluster.

8. The method according to claim 1 further comprising:
specifying, through a user interface, an initial project partition among the cluster of servers.

9. The method according to claim 1, wherein the weighted balancing rule causes each project to be distributed to at least a predetermined number of servers in the cluster.

10. The method according to claim 1, wherein the weighted balancing rule causes each project to be distributed to at least a predetermined percentage of servers in the cluster.

11. The method according to claim 1, wherein each server immediately responds to the partition plan upon receiving the partition plan.

12. The method according to claim 1, wherein each server responds to the partition plan after a predetermined delay.

13. The method according to claim 1, wherein the cluster of servers comprise one or more intelligence servers.

14. A system for partitioning a plurality of projects among a cluster of servers, the system comprising:
   a plurality of project partition modules, each residing in one of the cluster of servers, wherein each project partition module is adapted to:
   determine a status of project partition among the cluster of servers, wherein the cluster of servers hosts a common set of projects and each server of the cluster of servers hosts a subset of the plurality of projects;
   generate a partition plan for re-partitioning the plurality of projects among the cluster of servers based at least in part on the status and a partition policy, wherein the partition policy comprises one or more rules selected from a group consisting of:
      a user specified project-server association rule,
      a weighted balancing rule, and
      a project redundancy rule;
   communicate the partition plan to other project partition modules in the cluster; and
   cause the plurality of projects to be re-partitioned among the cluster of servers based on the partition plan.

15. An article of manufacture for partitioning a plurality of projects among a cluster of servers, the article of manufacture comprising:
   at least one processor readable carrier; and
   instructions carried on the at least one carrier;
   wherein the instructions are configured to be readable from the at least one carrier by at least one processor and thereby cause the at least one processor to operate so as to:
      determine a status of project partition among the cluster of servers, wherein the cluster of servers hosts a common set of projects and each server of the cluster of servers hosts a subset of the plurality of projects;
      generate a partition plan for re-partitioning the plurality of projects among the cluster of servers based at least in part on the status and a partition policy, wherein the partition policy comprises one or more rules selected from a group consisting of:
         a user specified project-server association rule,
         a weighted balancing rule, and
         a project redundancy rule;
      communicate the partition plan to each of the cluster of servers; and
      cause the plurality of projects to be re-partitioned among the cluster of servers based on the partition plan.

* * * * *